United States Patent [19]
Schilling et al.

[11] Patent Number: 5,464,560
[45] Date of Patent: Nov. 7, 1995

[54] FOAM-FORMING MIXTURES WITH DECREASED DECOMPOSITION OF HYDROHALOCARBON BLOWING AGENTS

[75] Inventors: Steven L. Schilling, Glen Dale; Robert P. Yeater, Moundsville, both of W. Va.; Phil M. Soland, Shadyside, Ohio; John F. Szabat, Pittsburgh, Pa.; Harold R. Parsons, Wheeling, W. Va.

[73] Assignee: Bayer Corporation, Pittsburgh, Pa.

[21] Appl. No.: 416,386

[22] Filed: Apr. 6, 1995

[51] Int. Cl.$^6$ ............................................. C09K 3/00
[52] U.S. Cl. ..................... 252/182.24; 252/182.27; 252/182.28; 252/182.29; 521/130; 521/170; 521/172; 521/174
[58] Field of Search .................. 252/182.24, 182.29, 252/182.27, 182.28; 521/130, 170, 172, 174

[56] References Cited

U.S. PATENT DOCUMENTS 5,137,929  8/1992  Demmin et al. .......................... 521/99

OTHER PUBLICATIONS

Minimization of HCFC–141b Decomposition in Rigid Polyisocyanurate Foams, Bodnar et al 34th Annual Polyurethane Technical/Marketing Conference, Oct. 21–24, 1992, pp. 374–383.

Primary Examiner—Morton Foelak
Attorney, Agent, or Firm—Joseph C. Gil; Lyndanne M. Whalen

[57] ABSTRACT

An organic acid having at least two carboxylic acid groups, no tertiary amino groups and a $pK_a$ of up to 3.1 is added to an HCFC blowing agent or to a composition, preferably an isocyanate-reactive composition, in which an HCFC blowing agent is present to reduce decomposition of the HCFC blowing agent. The resultant compositions are useful in the production of polyisocyanurate, polyurethane and/or polyurea foams.

10 Claims, No Drawings

FOAM-FORMING MIXTURES WITH DECREASED DECOMPOSITION OF HYDROHALOCARBON BLOWING AGENTS

BACKGROUND OF THE INVENTION

The present invention relates to foam-forming mixtures in which the dehydrohalogenation of a hydrohalocarbon blowing agent is substantially avoided or reduced, a process for the production of foams from such mixtures and to the rigid foams produced from these mixtures.

It is known that rigid, low density polyurethane, polyurethane urea and polyisocyanurate foams may be produced by reacting and foaming a mixture which includes an organic diisocyanate or polyisocyanate with an isocyanate reactive mixture in the presence of a volatile blowing agent which vaporizes at temperatures generated during the reaction.

In the commercial production of rigid polyurethane, polyurethane urea and polyisocyanurate foams, chlorofluorocarbons such as trichlorofluoromethane have been used as the blowing agent. However, these chlorofluorocarbons are believed to have an adverse effect upon the earth's ozone layer. Replacements for these chlorofluorocarbons have therefore been sought.

At present, the most promising chlorofluorocarbon replacements appear to be the hydrohalocarbons. Because these hydrohalocarbons are less stable in the atmosphere than chlorofluorocarbons over an extended period of time, it is expected that the hydrohalocarbons will cause less damage to the ozone layer. However, these hydrohalocarbons have a greater tendency to degrade under foam-forming conditions than their chlorofluorocarbon predecessors. The hydrohalocarbons undergo dehydrohalogenation to form halogenated alkenes. They may also undergo reduction reactions in which halogen atoms are replaced with hydrogen.

One solution to the chlorofluorocarbon degradation problem which was suggested by Hammel et al in a paper entitled "Decomposition of HCFC-123, HCFC-123a, and HCFC-141b in Polyurethane Premix and in Foam," was to wait to add the HCFC (i.e., hydrogen-containing chlorofluorocarbon) to the foam-forming mixture until just before use. This solution is not, however, practical in commercial foam production processes.

Means for stabilizing hydrohalocarbons under foam forming conditions have, therefore, been sought by those in the art. U.S. Pat. No. 5,137,929, for example, teaches that inclusion of certain types of stabilizers in a foam-forming mixture reduces the amount of decomposition of a hydrohalocarbon blowing agent during the foaming process. Among the materials taught to be useful as stabilizers are esters, organic acids, anhydrides, aminoacids, ammonium salts, bromoalkanes, bromoalcohols, bromoaromatic esters, chloroalcohols, nitroalkanes, nitroalcohols, triarylmethyl chlorides, triarylmethyl bromides, 3-sulfolene, zinc dialkyldithiophosphate, haloalkyl phosphate esters, carbon molecular sieves, powdered activated carbon, zeolite molecular sieves, sulfonate esters, and haloalkyl phosphate esters.

In a paper entitled "Minimization of HCFC-141b Decomposition in Rigid Polyisocyanurate Foams," Bodnar et al takes a different approach. Bodnar et al recommends that the catalyst employed in the foam-forming reaction be selected so that any compatibilizer in the polyol will not be able to solvate the cation of the catalyst and thereby render the anion of the catalyst more reactive.

SUMMARY OF THE INVENTION

It is an object of the present invention to provide an isocyanate-reactive composition (preferably, a polyol composition) which is useful in the production of rigid polyurethane, polyisocyanurate and polyurethane urea foams with HCFC blowing agents.

It is another object of the present invention to provide an isocyanate-reactive composition (preferably, a polyol composition) for the production of rigid polyurethane, polyisocyanurate and polyurethane urea foams with HCFC blowing agents which does not cause significant dehydrohalogenation of the HCFC blowing agent.

It is also an object of the present invention to provide a composition for the production of polyurethane, polyisocyanurate and polyurethane urea foams with HCFC blowing agents.

It is another object of the present invention to provide a composition for the production of polyurethane, polyisocyanurate and polyurethane urea foams with HCFC blowing agents in which the HCFC blowing agent does not undergo dehydrohalogenation to any significant extent.

It is a further object of the present invention to provide a process for the production of polyurethane, polyisocyanurate and polyurethane urea foams in which an HCFC blowing agent is employed.

It is also an object of the present invention to provide polyurethane, polyisocyanurate and polyurethane urea foams having good physical properties which have been produced with an HCFC blowing agent.

These and other objects which will be apparent to those skilled in the art are accomplished by including a polycarboxylic acid in which no tertiary amine group is present having a $pK_a$ value of up to about 3.1 in an isocyanate-reactive material or composition (preferably, a polyol or polyol component) to be used in the production of HCFC-blown foams. The polycarboxylic acid may be included in any of the known isocyanate-reactive (preferably, polyol) components capable of producing a rigid polyurethane, polyisocyanurate or polyurethane urea foam. In a preferred embodiment of the invention, the polyisocyanate-reactive composition is a polyol or polyol component which includes a sucrose-based polyether polyol, particularly a sucrose-based polyether polyol that has been neutralized with an organic acid and still contains carboxylate salt.

DETAILED DESCRIPTION OF THE PRESENT INVENTION

HCFC blowing agents are known to decompose when included in isocyanate-reactive materials such as polyols, particularly polyols in which residual or added base or a salt formed from such base and a weak acid is present. Catalysts based upon carboxylate salts may also cause decomposition of the HCFC. Such decomposition has an adverse effect upon both the properties of foams made with the decomposed HCFC and upon the economics of the foam production process. Further, many of these haloalkene products possess unknown properties. It is therefore desirable to hold their formation to a minimum as a precautionary measure.

The present invention relates to the use of polycarboxylic acids in which no tertiary amino groups are present having a $pK_a$ value of up to about 3.1 in formulations to produce rigid polyurethane, polyisocyanurate and polyurethane urea foams with an HCFC blowing agent. The invention also relates to foaming processes in which these formulations are used and to the foams produced from these formulations.

Any of the known hydrohalocarbon or HCFC (i.e., hydrogen-containing chlorofluorocarbon) blowing agents which have a carbon-hydrogen bond next to a carbon-halogen bond may be used in the practice of the present invention. Specific HCFC blowing agents useful in the present invention include: 1-chloro-1,1-difluoroethane (HCFC-142b), 1-chloro-1-fluoro-2,2,2-trifluoroethane (HCFC-124), 1,1,1-trifluoro-2,2-dichloroethane (HCFC-123), 1,1-dichloro-1-fluoroethane (HCFC-141b) and combinations thereof. HCFC-141b is particularly preferred.

It is possible to include water or any of the known chlorofluorocarbon blowing agents with the HCFC blowing agents employed in the practice of the present invention. If water is used, it is preferably used in an amount of from about 0.25 to about 1.5 parts by weight water per 100 parts of isocyanate reactive material (e.g., polyol). Use of chlorofluorocarbon blowing agents is not preferred.

Any of the known organic polyisocyanates (as used herein, the term "polyisocyanate(s)" includes "diisocyanate(s)") may be used in the practice of the present invention. These polyisocyanates may be aromatic, aliphatic, cycloaliphatic or combinations thereof.

Specific examples of suitable polyisocyanates include: m-phenylene diisocyanate, p-phenylene diisocyanate, 2,4-toluene diisocyanate, 2,6-toluene diisocyanate, 1,6-hexamethylene diisocyanate, 1,4-hexamethylene diisocyanate, 1,4-cyclohexane diisocyanate, hexahydrotoluene diisocyanate and its isomers, 1,5-naphthylene diisocyanate, 1-methylphenyl-2,4-phenyl diisocyanate, 4,4'-diphenylmethane diisocyanate, 2,4'-diphenylmethane diisocyanate, 4,4'-biphenylene diisocyanate, 3,3'-dimethoxy-4,4'-biphenylene diisocyanate, 3,3'-dimethyldiphenylpropane-4,4'-diisocyanate, 2,4,6-toluene triisocyanate, 4,4'-dimethyldiphenyl-methane-2,2',5,5'-tetra-isocyanate and the polymethylene polyphenyl polyisocyanates. Prepolymers of these polyisocyanates are also useful in the practice of the present invention.

A crude polyisocyanate may also be used to produce foams in accordance with the present invention. The crude toluene diisocyanate obtained by phosgenating a mixture of toluene diamines and the crude diphenylmethane diisocyanate obtained by phosgenating crude diphenylmethane diamine are examples of suitable crude polyisocyanates.

Preferred polyisocyanates are toluene diisocyanate and prepolymers of toluene diisocyanate having an average functionality of from about 1.8 to about 3.5 (preferably from about 2 to about 3.5) and an NCO content of from about 28 to about 48%, preferably from about 32 to about 48% and methylene-bridged polyphenyl polyisocyanates and prepolymers of methylene-bridged polyphenyl polyisocyanates having an average functionality of from about 1.8 to about 3.5, preferably from about 2.0 to about 3.1 isocyanate moieties per molecule and an NCO content of from about 28 to about 34% by weight.

The polycarboxylic acid additive required in the present invention is generally included in the isocyanate-reactive component of a foam-forming composition. Suitable polycarboxylic acid additives include any of the polycarboxylic acids having a p$K_a$ of up to about 3.1 in which no tertiary amino groups are present. Any organic acid having at least 2 carboxylic acid groups, preferably from 2 to 4 carboxylic acid groups and a p$K_a$ of up to about 3.1, preferably from about 1.3 to about 3.1, in which no tertiary amino groups are present may be used as the additive required in the present invention. Specific examples of suitable polycarboxylic acid additives include: oxalic acid; fumaric acid; 1,2,4,5-benzene tetracarboxylic acid; 1,2,3,4-butane tetracarboxylic acid; tartaric acid; citric acid; maleic acid; phthalic acid; and malonic acid. Oxalic acid; fumaric acid; maleic acid; tartaric acid; 1,2,4,5-benzene tetracarboxylic acid; and 1,2,3,4-butane tetracarboxylic acid are particularly preferred additives.

The polycarboxylic acid additive is generally included in the isocyanate-reactive component of the foam formulation in an amount of from about 0.05 to about 3% by weight, based on the total weight of isocyanate-reactive compounds, preferably from about 0.1 to about 1.5% by weight.

In principle, any compound containing at least two Zerewitinoff active hydrogen atoms and having a molecular weight of from about 60 to about 10,000 may be included in the foam-forming mixtures of the present invention. Such compounds may contain amino groups, thiol groups, carboxyl groups and/or hydroxyl groups. Compounds containing hydroxyl groups and having a molecular weight of from about 60 to about 8000, most preferably from about 300 to about 6000 are preferred. Compounds containing amino groups having a molecular weight of from about 300 to about 4000 are also preferred.

Preferred compounds containing hydroxyl groups include: polyesters, polyethers, polythioethers, polyacetals, polycarbonates, and polyester amides containing at least 2, generally from 2 to 8, but preferably from 2 to 6 hydroxyl groups. Polyethers containing at least 2, generally from 2 to 8, most preferably 2 to 6 hydroxyl groups are particularly preferred.

It has been found to be particularly advantageous to use sucrose-based polyether polyols having an average molecular weight of from about 400 to about 1200 which have been produced by reacting sucrose, and optionally other initiators with propylene oxide and/or ethylene oxide in the presence of an alkaline catalyst and treated to neutralize and/or remove the catalyst. Amine-based polyether polyols such as those prepared by reacting aromatic or aliphatic amines with propylene and/or ethylene oxide are also preferred.

The additives of the present invention are particularly effective in reducing the decomposition of HCFCs when used in combination with polyether polyols that have been neutralized with an acid or which contain the salts of an acid. Polyether polyols which have been neutralized with an organic acid such as lactic acid are examples of polyols with which the additives of the present invention are particularly effective.

Relatively low molecular weight (i.e., a molecular weight of from about 32 to 400) isocyanate-reactive materials may also be included in the foam-forming reaction mixtures of the present invention. These low molecular weight isocyanate reactive materials may contain hydroxyl groups and/or amino groups and/or thiol groups and/or carboxyl groups. Compounds containing hydroxyl and/or amino groups are preferred. These compounds which generally contain from 2 to 8 and preferably from 2 to 4 isocyanate-reactive hydrogen atoms serve as chain extenders or crosslinking agents. Specific examples of suitable low molecular weight isocyanate-reactive compounds include: glycols such as ethylene glycol, propylene glycol, diethylene glycol, and triethylene glycol; diols such as 1,3-butanediol, 1,4-butanediol, 1,6-hexanediol, 1,5-pentanediol, 1,3-propanediol, and 1,10-decanediol; glycerol; trimethylol propane; pentaerythritol; 1,2,6-hexanetriol; sorbitol; and diamines such as diethyl toluene diamine.

Any of the catalysts known to be useful in the production of rigid polyurethane, polyisocyanurate or polyurethane urea foams may be used in the practice of the present invention.

Tertiary amines are particularly useful. Specific examples of catalysts which may be used in the practice of the present invention include: triethylene diamine; the glycolic acid salt of triethylene diamine; the amine catalyst which is commercially available under the name Dabco 85 from Air Products and Chemicals, Inc.; acid blocked triethylene diamine; pentamethyl diethylene triamine; N,N-dimethyl-cyclohexylamine; N,N',N"-tris-(N,N-dimethyl-3-aminopropyl)-S-hexahydrotriazine; N,N,N-trimethyl-N-hydroxyethyl-bis-aminoethylether; N,N-bis-(3-dimethylaminopropyl)-N-isopropylamine; triethylamine; tributylamine; N,N,N',N'-tetramethylene diamine; 1,4-diazabicyclo-(2,2,2)-octane; N-methyl-N'-dimethylaminoethyl-piperazine; N,N-dimethylbenzylamine; and monocyclic and bicyclic amidines. Organometallic catalysts such as dibutyl tin dilaurate, dibutyl tin oxide, dibutyltin dichloride, dibutyl tin diacetate, dibutyl tin maleate, dioctyl tin diacetate, tin(II) acetate, tin(II)octoate, and tin(II)-ethylhexoate may also be used.

The additives of the present invention are also effective in reducing HCFC decomposition due to the use of catalysts which are based on acid salts. Such HCFC decomposition is known to occur when a catalyst based on a carboxylate salt such as the potassium salt of 2-ethylhexanoic acid is used to produce a polyurethane foam.

Foams may be produced in accordance with the present invention by reacting an isocyanate and isocyanate-reactive materials in amounts such that the equivalent ratio of isocyanate to isocyanate reactive groups is from about <1.0 to about 3, preferably from about 1.0 to about 2.5. The HCFC blowing agent is generally included with the isocyanate-reactive compound in an amount of from about 10 to about 60 parts by weight, preferably from about 10 to about 40 parts by weight per 100 parts of polyol.

When a catalyst is included in the foam-forming mixture, it is preferably used in an amount of from about 0.25 to about 8 parts by weight, based on 100 parts by weight of isocyanate-reactive material, most preferably from about 0.25 to about 3.0 parts by weight.

Foams may be produced from foam-forming mixtures which include an acid within the scope of the present invention and an HCFC blowing agent using any of the known methods. It is preferred that all of the isocyanate reactive compound(s), polycarboxylic acid additive, catalyst, blowing agent, any surfactant and any flame retardant be combined to form an isocyanate-reactive component (commonly referred to as the "B-Side" by those skilled in the art) before being combined with the polyisocyanate (commonly referred to as the "A-Side" by those skilled in the art).

Foams produced in accordance with the present invention are characterized by good overall physical properties and excellent insulation properties. Decreased levels of HCFC decomposition, particularly decomposition of HCFC-141b to HCFC-1131 are achieved.

Having thus described our invention, the following examples are given as being illustrative thereof. All parts and percentages given in these examples are parts by weight and percentages by weight, unless otherwise indicated.

EXAMPLES

The following materials were used in the Examples given below:

POLYISOCYANATE A: A polyether polyol-modified toluene diisocyanate prepolymer having a 34% NCO content which is commercially available from Bayer Corp. under the name Mondur E-437.

POLYISOCYANATE B: A modified polymethylene polyphenyl polyisocyanate prepolymer having an NCO content of 29.5% which is commercially available from Bayer Corp. under the name Mondur E-577.

POLYOL A: A tetrafunctional polyether polyol prepared by (1) reacting toluene diamine with ethylene oxide and then propylene oxide in the presence of a pH-basic catalyst, (2) neutralizing the reaction mixture with sulfuric acid and (3) removing the salts formed in (2) by filtration. This polyol has an OH number of 460 and is commercially available from Bayer Corp. under the name Multranol 4063.

POLYOL B: A sucrose-initiated polyether polyol formed by reacting sucrose, propylene oxide and water first with ethylene oxide and then propylene oxide in the presence of a pH-basic catalyst and subsequently neutralizing the reaction mixture with lactic acid. This polyol which had an OH number of 470 is commercially available from Bayer Corp. under the name Multranol 9196.

POLYOL C: A polyether polyol produced by reacting ethylene diamine with propylene oxide in the presence of potassium hydroxide catalyst, neutralizing the catalyst with an acid and removing the salt by filtration. This polyol which had an OH number of 770 is commercially available from Bayer Corp. under the name Multranol 9181.

POLYOL D: A polyol having an OH number of 250 which is commercially available from Stepan Co. under the name Stepanpol PS-2502A.

POLYOL E: A sucrose-based polyether polyol produced by propoxylation in the presence of a basic catalyst, neutralizing the basic catalyst with strong acid and removing the salt which formed by filtration. This polyether polyol which had an OH number of 470 is available from Bayer Corp. under the name Multranol 4034.

HCFC-141b: 1,1-dichloro-1-fluoroethane.

CATALYST A: N,N-dimethylcyclohexylamine (commercially available under the name Polycat 8)

CATALYST B: N,N',N"-tris(N,N-dimethyl-3-aminopropyl)-S-hexahydrotriazine which is commercially available under the name Polycat 41.

CATALYST C: 1,1,4,7,7-pentamethylene diethylenetriamine which is commercially available from Rhein Chemie under the name Desmorapid PV.

SURFACTANT A: the siloxane polyalkylene copolymer which is commercially available from OSI Specialties, Inc. under the designation L-6900.

SURFACTANT B: the siloxane polyalkylene copolymer which is commercially available from OSI Specialties, Inc. under the designation L-5440.

Example 1

A mixture of each of the additives indicated in TABLE 1 in POLYOL B was prepared. The concentration of additive in each of these mixtures is indicated in TABLE 1. Each of these mixtures was individually placed in a 50 ml serum vial in an amount of 1.6 grams. 0.4 grams of HCFC-141b were then added to a vial containing each mixture and a cap was crimped onto each vial. Vials containing 1.6 grams of POLYOL B and 0.4 grams of HCFC-141b to which no additive was added (i.e., control samples) were also prepared and a cap was crimped onto each of these vials. All of the vials were heated to 140° C. for 16 hours in order to allow decomposition of the HCFC-141b to occur. The vials were then cooled to 80° C. and maintained at this temperature for 24 hours. The amount of HCFC-1131a (i.e., decomposition product of HCFC-141b) was then measured by head space gas chromatography.

The percent change (i.e., the difference in the amount of HCFC-1131a generated attributable to a given additive) was determined by comparing the amount of HCFC-1131a present in samples in which an additive was present with the amount of HCFC-1131a present in the control samples.

The additives tested, percent change (i.e., the difference between the amount of HCFC-1131a present in a sample with an additive and the control sample divided by the amount of HCFC-1131a present in the control sample and then multiplied by 100%), additive concentration and acidity (i.e., $pK_a$) of the additives tested are reported in TABLE 1.

TABLE 1

| Additive | % Change | Conc. (Wt %) | $pk_a$[1] |
|---|---|---|---|
| Oxalic Acid | −96 | 1.00 | 1.3 |
| Phosphoric Acid* | −94 | 1.00 | 2.2 |
| Chloroacetic Acid* | −91 | 1.00 | 2.9 |
| Sulfuric Acid* | −89 | 0.86 | −3.0 |
| Fumaric Acid | −79 | 1.00 | 3.1 |
| Benzoyl Chloride* | −78 | 1.26 | N/A[12] |
| Sulfuric Acid* | −75 | 0.43 | −3.0 |
| 1,2,4,5-BTC[2] acid | −72 | 1.00 | 1.9 |
| 1,2,3,4-BTC[3] acid | −72 | 1.00 | N/A |
| $Na_2$EDTA*[4] | −71 | 1.30 | 6.2 |
| Salicylic Acid* | −67 | 1.00 | 3.0 |
| Tartaric Acid | −66 | 1.00 | 3.0 |
| EDTA*[5] | −62 | 1.00 | 2.0 |
| ASA*[6] | −60 | 1.00 | 3.5 |
| Citric Acid | −58 | 1.00 | 3.1 |
| Maleic Acid | −58 | 1.00 | 1.9 |
| Trichloroethanol* | −53 | 1.00 | N/A |
| Phthalic Acid | −52 | 1.00 | 3.0 |
| 3,4-DNBA*[7] | −48 | 1.00 | 2.8 |
| 4-HBA*[8] | −42 | 1.00 | 4.6 |
| Nitromethane* | −40 | 1.00 | 10.2 |
| 2-ABA*[9] | −39 | 1.00 | 4.1 |
| Formic Acid* | −33 | 1.00 | 3.8 |
| Triethyl Phosphate* | −27 | 1.00 | N/A[13] |
| Benzoic Acid* | −16 | 1.00 | 4.2 |
| TCAA*[10] | −13 | 1.00 | 0.5 |
| 2,4-DHBA*[11] | −12 | 1.00 | 3.3 |
| Succinic Acid* | −12 | 1.00 | 4.2 |
| 2,4-Pentane-dione* | −9 | 1.00 | 8.2 |
| Acetic Acid* | −5 | 1.00 | 4.8 |
| Malonic Acid | −3 | 1.00 | 2.9 |
| Lactic Acid* | 5 | 0.95 | 3.9 |

*Comparative Example
[1]$pK_a$ of Additive taken from Lange's Handbook of Chemistry, 14th Edition. N/A means not available.
[2]Benzene tetracarboxylic acid
[3]Butane tetracarboxylic acid
[4]Disodium ethylene diamine tetraacetic acid
[5]Ethylene diamine tetraacetic acid
[6]acetyl salicylic acid
[7]dinitrobenzoic acid
[8]hydroxybenzoic acid
[9]acetyl-benzoic acid
[10]trichloroacetic acid
[11]dihydroxybenzoic acid
[12]reacts to liberate HCl
[13]reacts to liberate $H_3PO_4$ Example 2

100 parts by weight of POLYOL A, 2 parts by weight of SURFACTANT A, 25 parts by weight of HCFC-141b, 1.5 parts by weight of water, 3 parts by weight of CATALYST A, and either tartaric acid or maleic acid (the parts by weight of tartaric acid or maleic acid per 100 parts of polyol are reported in TABLE 2) were combined to form an isocyanate reactive component. 128 parts by weight of POLYISOCY-ANATE A were then reacted with this isocyanate-reactive component at an isocyanate index of 105. Each of the product foams had a density of from 1.5 to 1.6 lbs/ft$^2$. The specific additive used, the amount of that additive used, and the amount of dehydrohalogenation product present in the product foam are reported in TABLE 2.

TABLE 2

| SAMPLE | 3A | 3B | 3C | 3D | 3E |
|---|---|---|---|---|---|
| ADDITIVE | None | TA | TA | MA | MA |
| PBW ADDITIVE | — | 0.15 | 0.3 | 0.15 | 0.3 |
| μg HCFC-1131a/ g HCFC-141b* | 1300 | 430 | 280 | 740 | 880 |

*Determined by gas chromatography
TA: tartaric acid
MA: maleic acid

Example 3

33.29 parts of POLYOL B, 26.64 parts by weight of POLYOL D, 6.66 parts by weight of POLYOL C, 1.9 parts by weight of SURFACTANT B, 0.56 parts by weight of CATALYST B, 1.24 parts by weight of CATALYST C, 0.3 parts by weight of tartaric acid, 0.35 parts by weight of water and 29.36 parts by weight HCFC-141b were combined to form an isocyanate-reactive component. 101.4 parts by weight of POLYISOCYANATE B were then reacted with the isocyanate reactive component at an isocyanate index of 135. The product foam had a density of 1.5 pounds per cubic foot and less than 25 micrograms of HCFC-1131a per gram of HCFC-141b.

Example 4 (Comparative)

Example 3 was repeated with the exception that no tartaric acid was included in the isocyanate-reactive mixture. The product foam had a density of 1.5 pounds per cubic foot and 1700 micrograms of HCFC-1131a per gram of HCFC-141b.

Example 5

60 parts by weight of POLYOL E, 40 parts by weight of POLYOL B, 2 parts by weight of SURFACTANT A, 3 parts by weight of CATALYST A, 1.5 parts by weight of water, 0.3 parts by weight of tartaric acid and 25 parts by weight of HCFC-141b were combined to form an isocyanate-reactive component. 130.3 parts by weight of POLYISO-CYANATE A were reacted with this isocyanate-reactive component at an Isocyanate Index of 105. The product foam had a density of 1.5 pounds per cubic foot and 2,400 micrograms of HCFC-1131a per gram of HCFC-141b.

Example 6 (COMPARATIVE)

Example 5 was repeated with the exception that no tartaric acid was included in the isocyanate-reactive component. The product foam had a density of 1.5 pounds per cubic foot and 12,000 micrograms of HCFC-1131a per gram of HCFC-141b.

Example 7

100 parts by weight of POLYOL B, 2 parts by weight of SURFACTANT A, 3 parts by weight of CATALYST A, 0.3 parts by weight of tartaric acid, 1.5 parts by weight of water and 25 parts by weight of HCFC-141b were combined to form an isocyanate-reactive component. 130.3 parts by weight of POLYISOCYANATE A were reacted with this isocyanate-reactive component at an Isocyanate Index of 105. The product foam had a density of 1.5 pounds per cubic foot and 11,000 micrograms of HCFC-1131a per gram of HCFC-141b.

Example 8 (Comparative)

Example 7 was repeated with the exception that no tartaric acid was included in the isocyanate-reactive component. The product foam had a density of 1.5 pounds per cubic foot and 37,600 micrograms of HCFC-1131a per gram of HCFC-141b.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyisocyanate-reactive composition comprising:
   a) an isocyanate-reactive compound having at least two hydrogen atoms which are reactive with isocyanate groups,
   b) an organic acid containing at least two carboxylic acid groups in which no tertiary amino groups are present and having a $pK_a$ of up to 3.1 and
   c) an HCFC blowing agent.

2. The composition of claim 1 in which organic acid b) is used in an amount of from about 0.05 to about 1.5% by weight, based on the weight of a).

3. The composition of claim 1 in which the isocyanate-reactive compound a) is selected from polyether polyols, polyester polyols, polythioethers, polyacetals and polycarbonates.

4. The composition of claim 1 in which the isocyanate-reactive compound a) is a polyether polyol having residual pH-basic material present therein.

5. The composition of claim 4 in which the organic acid b) is selected from oxalic acid, fumaric acid, 1,2,4,5-benzene tetracarboxylic acid, citric acid, maleic acid, 1,2,3,4-butane tetracarboxylic acid, tartaric acid, phthalic acid and malonic acid.

6. The composition of claim 5 in which the HCFC blowing agent is selected from 1-chloro-1,1-difluoroethane, 1-chloro-1-fluoro-2,2,2-trifluoroethane, 1,1,1-trifluoro-2,2-dichloroethane, 1,1-dichloro-1-fluoroethane and combinations thereof.

7. The composition of claim 3 in which the organic acid b) is selected from oxalic acid, fumaric acid, 1,2,4,5-benzene tetracarboxylic acid, citric acid, maleic acid, 1,2,3,4-butane tetracarboxylic acid, tartaric acid, phthalic acid and malonic acid.

8. The composition of claim 3 in which the HCFC blowing agent is selected from 1-chloro-1,1-difluoroethane, 1-chloro-1-fluoro-2,2,2-trifluoroethane, 1,1,1-trifluoro-2,2-dichloroethane, 1,1-dichloro-1-fluoroethane and combinations thereof.

9. The composition of claim 1 in which the organic acid b) is selected from oxalic acid, fumaric acid, 1,2,4,5-benzene tetracarboxylic acid, citric acid, maleic acid, 1,2,3,4-butane tetracarboxylic acid, tartaric acid, phthalic acid and malonic acid.

10. The composition of claim 1 in which the HCFC blowing agent is selected from 1-chloro-1,1-difluoroethane, 1-chloro-1-fluoro-2,2,2-trifluoroethane, 1,1,1-trifluoro-2,2-dichloroethane, 1,1-dichloro-1-fluoroethane and combinations thereof.

* * * * *